United States Patent [19]

Nakamura et al.

[11] 3,968,466

[45] July 6, 1976

[54] PRESSURE TRANSDUCER

[75] Inventors: Hiroshi Nakamura; Kouji Tsukada; Susum Sugiyama, all of Nagoya, Japan

[73] Assignee: Kabushiki Kaisha Toyota Chuo Kenkyusho, Japan

[22] Filed: Oct. 9, 1974

[21] Appl. No.: 513,301

[30] Foreign Application Priority Data

Oct. 9, 1973   Japan.............................. 48-113601

[52] U.S. Cl............................. 338/42; 73/88.5 SD; 338/4; 357/26
[51] Int. Cl.²........................................... H01C 7/16
[58] Field of Search.................... 338/2, 4, 5, 36, 42; 73/88.5 SD, 398 AR; 357/26

[56] References Cited
UNITED STATES PATENTS

| | | | |
|---|---|---|---|
| 3,654,579 | 4/1972 | Kurtz................................ | 357/26 X |
| 3,739,315 | 6/1973 | Kurtz................................ | 338/4 X |
| 3,764,950 | 10/1973 | Wallia................................ | 338/4 X |

*Primary Examiner*—C. L. Albritton
*Attorney, Agent, or Firm*—Oblon, Fisher, Spivak, McClelland & Maier

[57] ABSTRACT

A pressure transducer includes a semiconductor diaphragm of a predetermined conductivity having a strain sensitive region capable of being elastically deformed by means of the external pressure applied thereto, a fixing region having a high degree of rigidity, central and peripheral strain sensitive elements disposed along the crystallographic directions thereof and exhibiting high sensitivity and which are respectively insulatingly disposed within the vicinity of the central and peripheral portions of the strain sensitive region of the diaphragm, lead portions insulatingly disposed upon the diaphragm and extending from the strain sensitive region to one side of an end portion in the fixing region for transmitting electrical signals from the sensitive elements, the leads being connected to the central and peripheral strain sensitive elements at one end thereof in order to collectively form a bridge circuit, and electrodes respectively provided upon the other end portions of the lead portions and within the end portion of the fixing region. A supporting member includes a supporting portion for supporting the semiconductor diaphragm through means of the fixing region of the diaphragm, and a leading portion for conducting the electrical signals therethrough, lead wires being connected to the electrodes of the lead portions and being passed through the leading portion of the supporting member. The pressure transducer transmits the electrical signals detected by means of the strain sensitive elements to the electrodes by means of the lead portions and in turn conducts the electrical signals through the lead wires to the processing apparatus. As the pressure transducer does not require internal space for connecting the lead wires to the strain sensitive elements, the pressure transducer is extremely thin and compact and is suitable for mass-production.

20 Claims, 8 Drawing Figures

PRESSURE TRANSDUCER

BACKGROUND OF THE INVENTION

1. Field of the Invention

The present invention relates generally to pressure transducers and more particularly to a pressure transducer which utilizes a semiconductor diaphragm and is substantially miniaturized in size and of the super-thin, high sensitivity type.

2. Description of the Prior Art

When there is a need to accurately measure local pressures acting upon fluid-contacting surfaces, such as for example, the surface of an aircraft or the surface of a turbine blade, it is of supreme importance to use a pressure transducer which is highly responsive to such pressure and can accurately detect minor pressure changes. For this purpose, there has been widely used a semiconductor diaphragm type pressure transducer which can detect the pressure by utilizing the principle that the resistivity of semiconductor elements formed upon a diaphragm varies in accordance with the strain exerted upon the semiconductor elements by means of the pressure applied to the diaphragm according to a so-called peizoresistive effect. This semiconductor diaphragm type pressure transducer has a greater degree of sensitivity and is more compact in size as compared with conventional pressure transducers within which a semiconductor diaphragm is not employed.

However, such a semiconductor diaphragm type pressure transducer has disadvantages in that, when mounted upon the local portion of the aircraft wing surface or upon the surface of a turbine blade which is in contact with a fluid, the profile drag of the pressure transducer disturbs the flow of the fluid, and in this connection, the pressure transducer incorporating semiconductor elements having a high degree of sensitivity is insufficient in overcoming the aforesaid disadvantages, and thus it is required to provide a pressure transducer which is substantially miniscule in size in order to produce a negligible amount of disturbance. More particularly, when the pressure transducer is mounted upon the aircraft wing surface, it is possible to minimize the drag of the pressure transducer in the direction extending along the wing surface by smoothing the surface of the device which is parallel with the wing surface, however it is extremely difficult to minimize the height or thickness of the pressure transducer in the direction perpendicular to the wing surface.

SUMMARY OF THE INVENTION

Accordingly, it is an object of the present invention to provide an improved pressure transducer.

Another object of the present invention is to provide a simple and unique pressure transducer.

Yet another object of the present invention is to provide a thin and compact pressure transducer.

Still another object of the present invention is to provide a pressure transducer which exhibits a high degree of accuracy and stability.

The foregoing objectives have been achieved according to the present invention through the provision of a diaphragm type pressure transducer which is extremely compact, extremely thin, and which exhibits a high degree of sensitivity, the transducer having been developed by the inventors during research studies conducted in order to overcome the aforenoted disadvantages characteristic of the prior art. More particularly, the present invention provides an extremely thin pressure transducer having a thickness of as small as 0.8mm, as will be more apparent from the various embodiments to be described later. In contrast thereto, within the prior art, a pressure transducer having a thickness of less than 1.5mm could not be provided. The pressure transducer of the present invention has thus overcome the problem of providing transducers having such a thickness.

The pressure transducer according to the present invention includes a semiconductor diaphragm of a predetermined conductivity having a strain sensitive region elastically deformed by means of the external pressure applied thereto, a fixing region, central and peripheral strain sensitive elements disposed along the crystallographic directions thereof and exhibiting high sensitivity, and which are respectively insulatingly disposed within the vicinity of the central and peripheral portions of the strain sensitive region of the diaphragm, lead portions insulatingly disposed upon the diaphragm and extending from the strain sensitive region to one side of an end portion in the fixing region for transmitting electrical signals from the strain sensitive elements, the leads being connected to the central and outer strain sensitive elements in order to collectively form a bridge circuit, and electrodes respectively provided upon the lead portions and within the end portion of the fixing region. A supporting member includes a supporting portion for supporting the semiconductor diaphragm through means of the fixing region of the diaphragm, and a leading portion for conducting the electrical signals therethrough, lead wires being connected to the electrodes of the lead portions and being passed through the leading portion of the supporting member. The pressure transducer transmits the electrical signals detected by means of the strain sensitive elements to the electrodes by means of the lead portions and in turn conducts the electrical signals through the lead wires to the processing apparatus. As the pressure transducer does not require internal space for connecting the lead wires to the strain sensitive elements, the pressure transducer is extremely thin and compact and is suitable for mass-production.

More particularly, according to an example of the present invention, there is provided a pressure transducer which includes a thin plate type diaphragm having a strain sensitive region which is adapted to be elastically deformed in accordance with an external pressure applied thereto and which converts the elastic strain thus produced therewithin into an electrical signal, and a fixing or attaching region surrounding the strain sensitive region. A supporting member is also provided for attaching the fixing region of the diaphragm thereon in such a manner that the strain sensitive region may be subjected to the pressure to be measured. Lead wires for conducting the electrical signal outwardly of the diaphragm and supporting member are also provided, and a more detailed analysis of such components is as follows.

1. The diaphragm is composed of a thin plate and includes a single semiconductor crystal material of a predetermined conductivity, the strain sensitive region of the diaphragm being circular and the thickness thereof being thinner than that of the fixing region of the diaphragm. The diaphragm also includes a layer integrally formed upon one surface of the strain sensitive and fixing regions which layer has electrical insulating characteristics different from the single semiconductor crystal material of the diaphragm. In other words, the layer may have a different conductivity than that of the semiconductor crystal material of the diaphragm or may have the same conductivity as that of the semiconductor crystal material, however the resistivity thereof should be no more than one thousandth of the resistivity of the semiconductor crystal material. The layer is fabricated so as to have a predetermined pattern which includes the semiconductor strain sensitive elements for converting the strain produced therewithin into an electrical signal in accordance with the piezoresistive effect, when an external pressure is exerted upon the strain sensitive region.

The predetermined pattern comprises at least a pair of strain sensitive elements which are located within the central portion of the strain sensitive region and which have their longitudinal axes aligned with the crystallographic directions so as to maximize the sensitivity of such components, and at least one other pair of strain sensitive elements which are located within the circumferential portion of the strain sensitive region and which also have their longitudinal axes aligned with the crystallographic directions so as to similarly maximize the sensitivity thereof. The outer strain sensitive elements as the peripheral strain sensitive elements are also disposed symmetrically upon opposite sides of the center line of the strain sensitive region which extends parallel with the longitudinal axes of the center elements, and lead portions having a small resistance are respectively connected to the strain sensitive elements at one end thereof while the other ends thereof extend through the fixing region and include electrodes which are positioned close to one another in a parallel fashion.

2. The supporting member is made of a material having substantially the same coefficient of thermal expansion as that of the diaphragm material and such member is provided with a countersunk recessed portion having a configuration and an area which corresponds to that of the strain sensitive region of the diaphragm. A flat supporting part is in contact with the fixing region of the diaphragm, and a lead part is provided at the trailing end portion of the supporting member, the same including an opening within which the electrodes are disposed close to one another upon the lead portions of the diaphragm and through which leading parts of lead wires may be introduced for conducting the electrical signals from the transducer.

3. The lead wires are connected at one end thereof to electrodes disposed upon the lead portions formed upon the diaphragm and are conducted through the opening of the leading part provided within the supporting member and connected at the other end thereof to a signal processing circuit positioned externally of the transducer through means of hookup terminals positioned upon a holding member for reinforcing the supporting member.

The exemplary pressure transducer constructed according to the present invention may thus be used for a practical pressure measurement in such a manner that the surface of the diaphragm not having the strain sensitive elements disposed thereon is exposed to the fluid, such as for example, the atmosphere whose pressure is to be measured. As a result of such exposure, the circular strain sensitive region having a thinner thickness than the remainder portion of the diaphragm is strained by means of the external pressure force component of the pressure fluid, the central strain sensitive elements provided within the central portion of the strain sensitive region being subjected to the resulting tensile stress while the outer strain sensitive elements provided within the vicinity of the periphery of such region are subjected to a compression stress, electrical signals based upon the piezoresistive effect proportional to the strain generated within the strain sensitive elements thereby being produced. The electrical signals are then transmitted through the lead portions respectively connected to the center and outer elements to the electrodes provided at the end portions thereof and further to the signal processing circuit externally of the pressure transducer through means of the lead wires respectively connected to the electrodes, the pressure transducer fabricated in accordance with this example of the present invention thereby being capable of detecting a pressure change within the fluid with a high degree of responsibility and accuracy.

It may thus be seen that the pressure transducer constructed in accordance with this example of the present invention presents the following advantages which are based upon the structural features thereof, the same thereby contributing enormously to industry.

1. The central and outer strain sensitive elements provided within the strain sensitive region of the diaphragm are fabricated of the same single semiconductor crystal as that of the single semiconductor crystal material such as for example silicon, which forms the substrate of the diaphragm. The respective strain sensitive elements are integrally formed upon the diaphragm substrate and are electrically insulated therefrom, that is, the strain sensitive elements have a conductivity opposite to that of the single semiconductor crystal material forming the substrate of the diaphragm, or in the instance that the same conductivity type material is used as that of the diaphragm substrate, the strain sensitive elements have a resistivity which is no more than one thousandth that of the diaphragm substrate. More particularly, in the instance that the substrate of the diaphragm is of an N type silicon, the strain sensitive elements of the $N^+$ type silicon should be used so that the strain sensitive elements are effectively electrically insulated from the substrate of the diaphragm due to the difference in resistivity therebetween.

2. The strain sensitive region of the pressure transducer diaphragm of this example according to the present invention is substantially of a circular configuration wherein the central and outer strain sensitive elements are disposed at the central and circumferential portions thereof, respectively, and the longitudinal directions of the central and outer strain sensitive elements are selectively aligned with respect to the crystallographic directions so as to provide approximately maximum sensitivity within the strain sensitive region. The respective strain sensitive elements are thus highly responsive to strains caused within the strain sensitive region despite the minimized area of the strain sensitive region.

3. The outer strain sensitive elements are disposed at the circumference of the strain sensitive region and symmetrically with respect to the center line of the region which extends parallel with the longitudinal axes of the center strain sensitive elements, the central and outer strain sensitive elements thereby being positioned within a semi-circular area of the strain sensitive region. This in turn permits the formation of the respective strain sensitive elements with a relatively uniform thin layer of semiconductor material, such as for example, a diffused or epitaxial layer of silicon, whereby the characteristics of the strain sensitive elements can be rendered relatively equal.

4. Since the central and outer strain sensitive elements disposed within the circular strain sensitive region of the diaphragm are collectively located within a semi-circular area of the strain sensitive region, there is less danger that a difference in temperature will occur between the pressure atmosphere which will be exerted upon the respective strain sensitive elements due to any local temperature differences existing within the pressure fluid to be measured, nor the occurrence of disturbances of the thermal outputs of the respective strain sensitive elements due to the heat generated by the elements resulting from the current flows through the respective strain sensitive elements themselves.

5. As the semiconductor diaphragm of the present invention is formed in such a manner that the portion thereof corresponding to the strain sensitive region and the remaining portion thereof corresponding to the fixing region are integrally formed therewithin by etching a desired portion of the diaphragm so as to define the strain sensitive region to a desired thickness and thereby form the strain sensitive region so as to have a thinner thickness than the fixing region, the likelihood of breakage of the same during the fabrication process is substantially reduced and the same can be easily produced as compared with a device within which a strain sensitive material of a uniformly thin thickness and which is made of brittle single crystals is secured to a supporting member at the circumference thereof so as to form the circular strain sensitive region within the central portion of the device. Particularly, the thickness of the strain sensitive region can be adjusted to a desired value by means of the etching process or the like corresponding to the required necessity, and consequently, a pressure transducer having desired characteristics for meeting predetermined objects and applications can be easily manufactured.

6. The other end of the lead portions respectively connected with the strain sensitive elements provided within the strain sensitive region are elongated so as to extend one side of the end portion in the fixing region and are formed with electrodes at the tip portions thereof, having a high degree of rigidity which is comparable to that of the fixing portion of the diaphragm so as to be supported upon the supporting member, the electrodes of course being connected to the lead wires. The lead wires connected to the electrodes are in turn led out to a position exterior of the diaphragm through means of a leading part provided within the supporting member which also includes an opening which is correspondingly positioned relative to the electrodes of the diaphragm. Thus, the attachment of the lead wires is vastly simplified and there is little trouble after attachment.

7. In addition, the electrodes are collectively located in close relation with respect to one another. Such a disposition of the electrodes is not only beneficial for leading the lead wires in a compact manner with respect to the width dimension but is also convenient for leading the lead wires in the longitudinal direction. This avoids difficulties as to the manner in which the lead wires are conducted out of the pressure transducer as well as other difficulties encountered in technology, and may thus provide a thin type transducer which is suitable for mass-production.

8. The diaphragm is bonded to the supporting member in an intimate contacting relationship throughout the fixing region and surrounding the strain sensitive region, the contacting area of the diaphram relative to the supporting member thereby being increased to the maximum extent. In this manner, the diaphragm of the embodiments according to the present invention can thus be easily bonded to the supporting member without requiring strict alignment and is therefore suited for mass production.

9. Since the coefficient of thermal expansion of the supporting member for supporting the diaphragm is substantially the same as that of the diaphragm, creep and hysteresis of both members subsequent to bonding are minimized, and the diaphragm is not influenced by any thermal stress imparted by the supporting member. Thus, the present device has high stability.

10. As is apparent from the above, according to the pressure transducer of this example according to the present invention, the relatively small diaphragm includes a strain sensitive region having a circular configuration and being integrally formed with the diaphragm which is made of single semiconductor crystals. In addition, the respective strain sensitive elements are integrally formed within the strain sensitive region having a minimized area and are located in positions so as to render maximum sensitivity. The minimized area of the strain sensitive region encompasses a semi-circular expanse which serves to easily lead the electrical signals by means of the lead portions and lead wires to a position exterior of the transducer, the electrical signals corresponding of course to strains sensed by means of the strain sensitive elements according to the piezoresistive effect. The lead wires are collectively positioned upon one side of the diaphragm along the surface thereof so that the thickness of the pressure transducer can be minimized, and it is seen that such a sophisticated arrangement of the above-noted components permits the manufacture of a pressure transducer having an extremely small size and minimized thickness, yet presenting a high degree of sensitivity and yet exhibiting a satisfactory high yield rate and low cost in mass production.

11. Since the pressure transducer of this example according to the present invention is extremely small in size and extremely thin, even when the device is mounted so as to be exposed to a pressure fluid whose pressure is to be measured, the transducer itself will not cause any disturbance within the fluid flow which would hinder or render erroneous the measurement of the pressure changes within local areas of the fluid. In this manner, the present transducer of this example according to the present invention can detect pressure change with a high degree of sensitivity and accuracy.

12. Furthermore, according to the pressure transducer of this example according to the present invention, a plurality of transducers may be continuously mounted upon the surface of a body subjected to a pressure fluid whose pressure is to be measured in dependence upon the objects of the measurement and conditions of the tests, whereby dynamic measurement distribution of the pressure of the fluid distributed over the area of the surface of the body may be effected.

With respect to the materials to be used, an N type silicon single crystal is optimum as a material for the diaphragm, as will be apparent from the embodiments to be described hereinafter, due to the fact that it is easy to manufacture and exhibits desired characteristics, and the strain sensitive elements of a thin layer of P type silicon may be integrally formed upon the diaphragm by means of the mask diffusion method or the epitaxial growth method. However, materials for the diaphragm of the present invention should not necessarily or solely be limited to silicon, and hence other semiconductor crystals may be used depending upon the objects and applications of the measurements.

It should be noted however that, even in the instance of a semiconductor diaphragm having its base made of the same single silicon crystal as that of the diaphragm described above, an N⁺ type silicon layer such as used within the strain sensitive elements may be integrally formed upon the base of an N type silicon, or an N type silicon layer may be formed upon the base of a P type silicon. Still further, a P⁺ type silicon layer may be formed upon the base of a P type silicon. In other words, any known semiconductor materials may be used so long as the electrical insulation is substantially maintained between the base of the diaphragm and the layer of the semiconductor material formed thereon, that is, according to the P-N junction, a P-P⁺ junction, an N-N⁺ junction, or the like. The meaning of the phrase "the layer of the semiconductor of the same conductivity as that of the base of the diaphragm and having a resistivity of no more than one thousandth that of the base" is similarly applicable to the layer of an N⁺ type or a P⁺ type semiconductor.

In order to meet the demand of maximum sensitivity for strain sensitive elements and the location of the lead wires to be collected upon one side of the diaphragm having an extremely minimized thickness, all strain sensitive elements should be located within a semi-circular area of the circular strain sensitive region. It follows from this that the crystallographic directions of the central and outer strain sensitive elements should be selected so as to afford maximum sensitivity in response to an external stress exerted upon the strain sensitive elements within the circular strain sensitive region, in connection with the selected crystallographic plane of the surface of the single crystal semiconductor diaphragm.

For example, as will be clear from the embodiments to be described, hereinafter, a N type silicon diaphragm has a crystallographic plane (110), and a P type silicon diffusion layer for forming strain sensitive elements is formed upon the diaphragm. In this case, the longitudinal direction of the central strain sensitive elements is selected to be in accord with the [1$\bar{1}$0] crystallographic direction while the longitudinal directions of the outer strain sensitive elements are selected to be in accord with the [$\bar{1}$11] and [$\bar{1}$1$\bar{1}$] crystallographic directions, respectively. Within this embodiment, it should be noted that if the longitudinal directions of the strain sensitive elements are selected so as to be in accord with the maximum sensitivity direction or the direction which is not precisely such but very close thereto, then the latter selection may in fact render substantially the same high sensitivity as that of the former in practical applications.

Alternatively, various other modifications are possible. For example, in the instance that the strain sensitive elements are of an N type silicon diffusion layer and are formed upon a P type silicon diaphragm, the crystallographic plane of the diaphragm may be selected to be the (100) plane while the longitudinal direction of the central strain sensitive elements may be selected to be in accord with the [011] crystallographic direction and the longitudinal directions of the outer strain sensitive elements in turn be respectively selected to be oriented in accord with the [010] and the [001] directions thereby presenting the optimum relationship between the crystallographic plane of the semiconductor diaphragm and the crystallographic directions of the strain sensitive elements.

Although the description has thus far been given of the arrangement of the pressure transducer which includes lead portions, one end of each of which is respectively connected to the strain sensitive elements located within the thin circular strain sensitive region of the diaphragm, while the other end of which is elongated so as to extend one side of the end position in the fixing region of the diaphragm so as to thereby form electrodes which are adapted to connect with lead wires at the end portions thereof for electrically connecting the transducer to external apparatus, the lead portions may alternatively be formed by selectively evaporating at desired portions of the leads metals such as for example aluminum, or the same may be integrally formed with the strain sensitive elements so as to form a layer thereon by using the same material so that of the strain sensitive elements, as shown in a second embodiment which will be described hereinafter. In the latter case, only the electrodes to be connected to the lead wires should be formed with a metallic vacuum evaporation film or else the lead wires may be ohmically connected to lead portions made of semiconductor material.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Referring now to the drawings and more particularly to FIGS. 1–5 thereof, a pressure transducer generally indicated by the reference character 1 includes a thin wafer diaphragm 2, a supporting member 3 for supporting the diaphragm 2 and a holding plate 4 for reinforcing the diaphragm assembly, lead wires 5 and 6 being provided for the electric output signals from diaphragm 2.

Figures 1, 2:
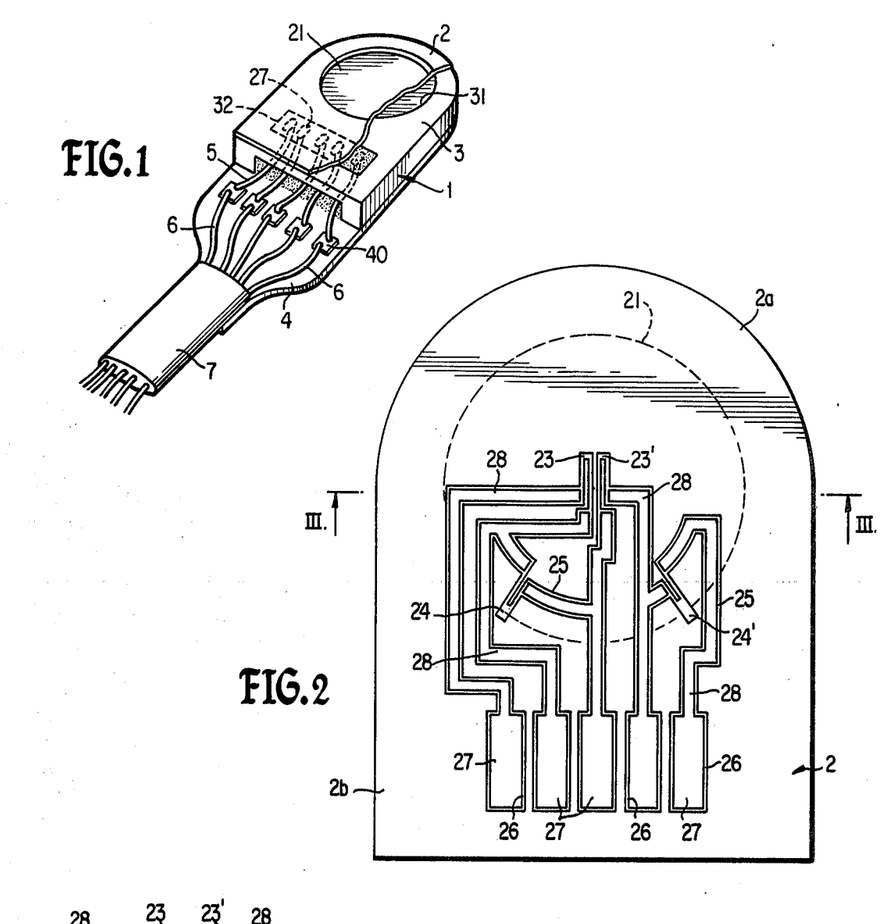
FIG. 1 is a perspective view, partly broken, of a pressure tranducer constructed in accordance with the present invention and showing its cooperative parts.
FIG. 2 is a plan view of a diaphragm utilized within the transducer of FIG. 1.

The diaphragm 2 is prepared by appropriately cutting a single N-type silicon crystal so as to have a configuration which includes an arcuate portion 2a and a rectangular portion 2b, the crystal having a small thickness. The upper and lower surfaces thereof are flat and have respectively (110) crystallographic planes and on one flat surface of thin diaphragm 2, a P type silicon layer of a predetermined pattern, as shown in FIG. 2, is integrally formed therewith according to the mask diffusion method.

Figure 3:
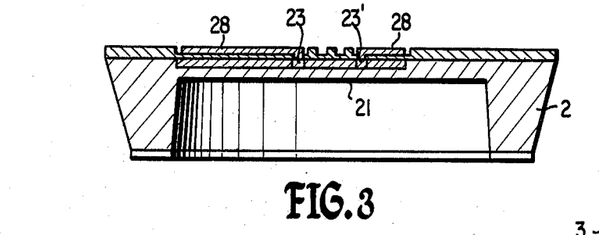
FIG. 3 is a cross-sectional view of the diaphragm of FIG. 2 taken along the line III—III of FIG. 2.

Within the other surface not provided with the P type silicon layer having the predetermined pattern, a recessed portion 21 having a circular configuration, which is concentric with the circular sector forming the arcuate portion 2a of the diaphragm is provided as shown in FIG. 3, the recessed portion having a wall thickness smaller than the other part of diaphragm 2. Such a recessed portion defines a strain sensitive region of diaphragm 2 and the other part 22 of the diaphragm 2 is referred to as a fixing region of the diaphragm to be supported by means of the supporting member 3. The recessed portion defining the strain sensitive region is formed by etching a desired portion of the diaphragm to a required depth using a known anisotropic etching method, and thus the strain sensitive region is flexible.

Referring more particularly to the electrical pattern of the diaphragm, there is provided a pair of strain sensitive elements 23 and 23' of U-shaped configuration and the longitudinal directions of which are in accord with the [1$\bar{1}$0] crystallographic directions, the elements being disposed within the central portion of the circular strain sensitive region 21. There is also provided a pair of outer strain sensitive elements 24 and 24', having the same configurations and sizes as those of the central strain sensitive elements, the same being disposed within the vicinity of the circumferential portion of the strain sensitive region 21 and within the rectangular portion 2b of diaphragm 2. The longitudinal directions of the outer strain sensitive elements 24 and 24' are respectively selected to be in accord with the [$\bar{1}$1$\bar{1}$] and [$\bar{1}$11] crystallographic directions and the outer strain sensitive elements 24 and 24' are also disposed symmetrically with respect to and upon opposite sides of the longitudinal axis of the transducer which passes between the pair of central strain sensitive elements 23 and 23' which also extend parallel to such axis.

Integrally connected to the respective U-shaped branched terminals of the central and outer sensitive elements 23 and 23', and 24 and 24', are strip connecting portions 25 provided within the rectangular portion 2b of diaphragm 2, portions 25 being either of an L or U type configuration. It is noted that the outer strain sensitive elements 24 and 24' have leg portions which are located radially inwardly of the circumference of the strain sensitive region 21, while the outermost ends thereof, that is, the unified portions, are located radially outwardly of the circumference of region 21.

The connecting portions 25 have sections which interconnect the respective strain sensitive elements 23 and 23', 24 and 24' within the strain sensitive region 21 of diaphragm 2, and have other sections which are elongated outwardly of region 21 so as to thereby form rectangular enlarged portions 26 which serve to form electrodes 27 at their tip portions. The enlarged portions 26 are disposed parallel to one another as well as with the linear edges of portion 2b of diaphragm 2, although the same are also set back from the edges.

Furthermore, the connecting portions 25 are simultaneously and integrally formed with the strain sensitive elements 23 and 23' and 24 and 24' by means of a P type diffusion layer having a predetermined pattern as shown in FIG. 2 formed by means of the mask diffusion method, so that the height of the upper surfaces of the connecting portions 25 as well as the strain sensitive elements 23 and 23' and 24 and 24' not having an oxide film is the same but such height is lower than the surface of the diaphragm 2 having an oxide film which has not been subjected to the mask diffusion. Thus, the one portion of the diaphragm 2 not having the oxide film which corresponds to the connecting portions 25 and the strain sensitive elements 23 and 23' and 24 and 24' is in effect formed into grooves of a very small depth with respect to the other portion of the diaphragm 2 which has the oxide film.

In addition, a known oxide film ($SiO_2$) is further formed upon the entire surface of diaphragm 2 including the surfaces of the respective strain sensitive elements 23 and 23' and 24 and 24' as well as the connecting portions 25 having the enlarged portions 26 at the end portions thereof, and aluminum films having a width slightly smaller than that of the grooves which correspond to the connecting portions 25 are formed ohmically with the strain sensitive elements beneath the oxide film which is formed upon the connecting portions. The aluminum films are of rectangular configuration quite similar to those of the connecting portions 25 and are formed according to a vacuum evaporation method, the surfaces of the aluminum films being substantially upon the same level as those surfaces of diaphragm 2 which have not been subjected to the mask diffusion.

One of the ends of each of the rectangular aluminum films is respectively ohmically connected to the ends of the strain sensitive elements and the other end thereof corresponding to the enlarged portions 26 is formed into electrode 27, and thus, lead portions 28 including the electrodes 27 are formed upon diaphragm 2. Still further, the central strain sensitive elements 23 and 23' and the outer strain sensitive elements 24 and 24' are electrically insulated from the base of the diaphragm by means of the P-N junction while the elements 23 and 23' and 24 and 24' are also electrically connected to lead portions 28 comprising the evaporated aluminum films, whereupon an external force or stress being applied to the strain sensitive region 21 of diaphragm 2, electrical signals are produced according to the piezoresistive effect and are transmitted through means of the lead portions 28 to electrodes 27 in a satisfactory manner.

The undersurfaces of the aluminum evaporated films formed into lead portions 28 including electrodes are lined, through the medium of an oxide film, with a P type silicon diffusion layer and the latter is electrically insulated from the base of the N type silicon diaphragm by means of the P-N junction defined and interposed therebetween, so that even in the presence of pin holes within the oxide film, mutual electrical insulation between the lead portions 28 including electrodes 27 may be effectively maintained.

Figure 4:
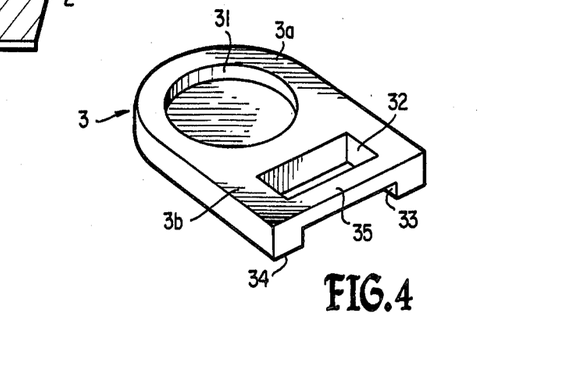
FIG. 4 is a perspective view of a supporting member utilized within the transducer of FIG. 1.

Referring now to FIG. 4, the supporting member 3 is fabricated from a rigid material, such as for example, crystallized glass, so as to have a plate type configuration, the coefficient of thermal expansion of member 3 being substantially the same as that of the silcon utilized within diaphragm 2. The supporting member 3 also has the same configuration as that of diaphragm 2 and therefore includes an arcuate portion 3a and a rectangular portion 3b. Within arcuate portion 3a of supporting member 3, a countersunk recess 31 is provided within the upper portion thereof and at a position which corresponds to the circular strain sensitive region 21 of diaphragm 2, while within the rectangular portion 3b thereof a lead portion is provided which includes a rectangular opening 32, which extends vertically through member 3 from the bottom surface thereof to the top surface thereof and the width of which is such as to accommodate therein the five electrodes 27 disposed in juxtaposition within rectangular portion 2b of diaphragm 2, and a cut-away portion 33 which is provided upon the underside of the rectangular portion 3b and at the leading edge thereof so as to be in communication with the opening 32.

Figure 5:
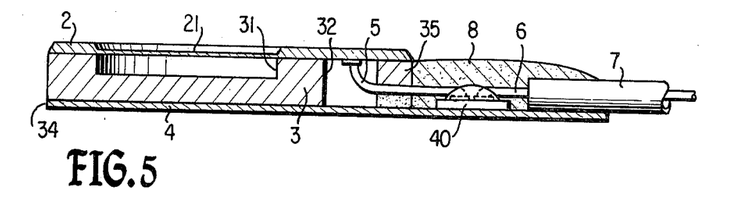
FIG. 5 is a cross-sectional view of the pressure transducer shown in FIG. 1.

Upon the upper flat surface of supporting member 3, the thin diaphragm 2 is disposed in such a manner that the surface thereof having the P type diffusion layer is opposed to the upper flat surface of member 3, both of the surfaces then being intimately bonded together by means of an adhesive, such as for example, an epoxy resin or the like. In this manner, air of a given quantity is sealingly filled within the countersunk recessed portion 31 of supporting member 3, with diaphragm 2 being bonded to the upper flat surface of the supporting member from which the recess 31 is defined so as to facilitate the measurement of the pressure in terms of an absolute pressure. The lower flat surface 34 of the supporting member 3 is similarly tightly bonded with an epoxy base adhesive to a holding member 4 which comprises a fiberglass plate having the same coefficient of thermal expansion as those of the diaphragm and the supporting member, holding plate 4 also having a configuration which includes an arcuate portion shaped substantially the same as that portion of diaphragm 2 and a tail portion the width of which is gradually reduced toward the end portion thereof.

Figure 6:
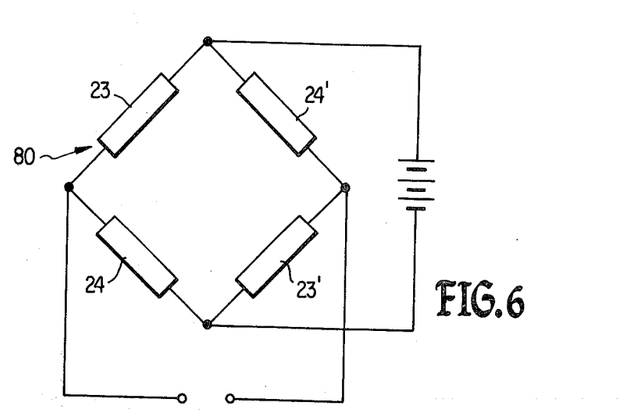
FIG. 6 is a schematic diagram of a bridge circuit characteristic of the pressure transducer of FIG. 1.

Upon the upper surface of holding plate 4 and disposed adjacent to the cut-away portion 33 of supporting member 3, five copper foils, each having the same configuration, are arranged at positions corresponding to the electrodes 27 disposed upon diaphragm 2, so as to thereby present hookup terminals 40 for the lead wires. Furthermore, gold wires 5 serving as the lead wires are ohmically connected to electrodes 27 upon diaphragm 2 in accordance with a known bonding method. The end portions of the respective gold wires 5 which are opposite to those portions connected to electrodes 27 disposed within opening 32 of supporting member 3 are then led out through the cut-away portion 33 to terminals 40, while the intermediate portions of the gold wires 5 are bonded with adhesive to the beam portion 35 which defines the upper extent of portion 33 of member 3. The other end portions of the gold wires 5 are then soldered to the hookup terminals 40 provided upon holding plate 4, and are further connected to other lead wires 6 which serve as input terminals of a cable 7 having a substantially flattened configuration, the other end of cable 7 being respectively connected to a measurement processing circuit, the respective strain sensitive elements 23 and 23' and 24 and 24' forming a full bridge circuit generally indicated by the reference character 80 for use in such measurement, as shown in FIG. 6. The exposed portions of the gold wires 5 and lead wires 6 are covered with a suitable insulating material 8 which may consist of a silicon rubber for providing electrical insulation in a well-known manner.

It is noted in accordance with the first illustrated embodiment of the present invention that the thickness of the strain sensitive region of diaphragm 2, upon which is formed strain sensitive elements 23 and 23' and 24 and 24', is very thin so that the bridge output is apt to be affected by light beams despite the fact that the surface of the diaphragm provided with the strain sensitive elements is disposed opposite to the bottomed recess portion 31 as a countersunk recess portion within supporting member 3 for the precise purpose of avoiding direct exposure of the strain sensitive elements to light beams from positions exterior of the pressure transducer, this consequence tending to produce noise during the pressure measurements. In order to prevent such shortcomings, a light shielding coating is applied to the entire surface of diaphragm 2 upon which surface the strain sensitive elements are not provided, when the diaphragm is exteriorly exposed.

The actual dimensions and characteristics of an exemplary pressure transducer fabricated in accordance with the first embodiment of the present invention have been tabularized as follows:

|  | Item of pressure transducer | Numerical value |
| --- | --- | --- |
|  | length of pressure transducer | 6mm |
|  | width of pressure transducer | 3mm |
|  | thickness of pressure transducer | 0.8mm |
|  | length of diaphragm | 4mm |
| Construction | width of diaphragm | 3mm |
|  | thickness of diaphragm | $120\mu$ |
|  | diameter of strain sensitive region of diaphragm | 2mm |
|  | thickness of strain sensitive region of diaphragm | $32 - 33\mu$ |
|  | thickness of supporting member | 0.5mm |
|  | bottomed recess within supporting member | 2mm |
|  | depth of supporting member | 0.2mm |
|  | range of pressure measurement | $0 - \pm 1^{kv}/cm^2$ |
|  | overload | 200% |
| characteristics | operational temperature range | $-30 - 90°C$ |
|  | compensating temperature range | $-20 - 80°C$ |
|  | output sensitivity | $19^{mv}/V^{kv}/cm^{2v/h}$ |

Figure 7:
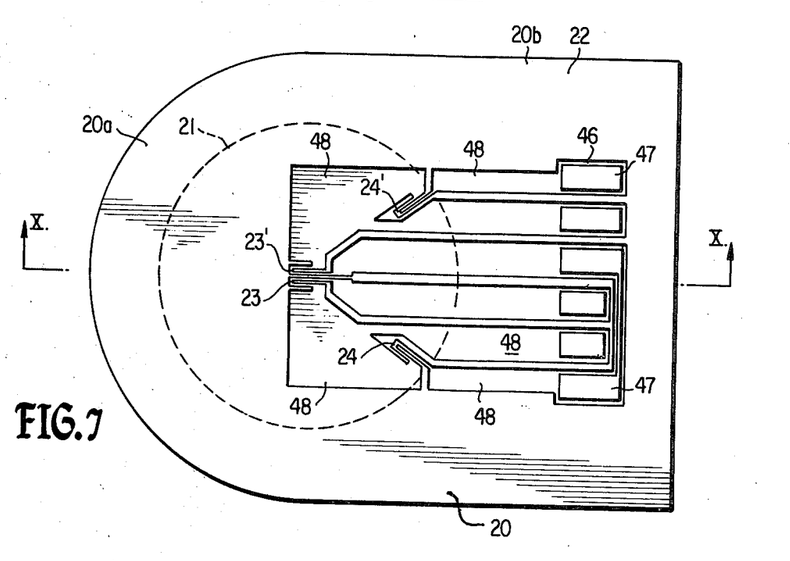
FIG. 7 is a plan view of a diaphragm utilized within a second embodiment of the present invention.
Figure 8:
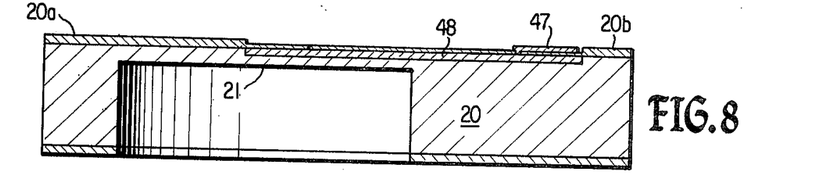
FIG. 8 is a cross-sectional view of the diaphragm of FIG. 7 taken along the line X—X of FIG. 7.

Referring now to FIGS. 7 and 8, a second embodiment of the present invention is disclosed and the primary difference between the first and second embodiments of the present invention is that according to the second embodiment, a metallic film, such as for example, an aluminum evaporated film, is only applied to the end portions of the lead portions so as to form electrodes thereon, the lead portions serving to transmit electrical signals from the strain sensitive elements to the electrodes as a result of the connection of the central and outer strain sensitive elements to the electrode portions. In other words, aluminum evaporation is not applied to any portions of the leads other than the end portions thereof.

Still more particularly, within the diaphragm 20 of the second embodiment, the electrical connecting portions consisting of a P type diffusion layer which was used for lining the aluminum lead portions within diaphragm 2 of the first embodiment are within the present embodiment widened to a great extent so as to thereby remarkably reduce the resistance as compared with that of the strain sensitive elements. Thus the connecting portions themselves are formed into lead portions 48 which have a large area for transmitting electrical signals from the strain sensitive elements. With this arrangement, according to the second embodiment, electrical signals from the strain sensitive elements 23 and 23' and 24 and 24' are transmitted to the electrodes through such lead portions consisting of a P type diffusion layer so as to thereby eliminate the step of providing the aluminum evaporated films, the manufacturing process therefore being substantially simplified and not likely to develop electrical problems.

Still yet more particularly, with the pressure transducer of the second embodiment of the present invention, there is provided, as shown in FIG. 7 a predetermined pattern consisting of a P type diffusion layer upon one flat surface of the diaphragm 20, which is disposed opposite to the other flat surface which is provided with a recessed portion for defining the circular strain sensitive region 21. The lead portions 48 for transmitting the electrical outputs, corresponding to the strains sensed by means of the strain sensitive elements, to the electrodes 47 are simultaneously and integrally formed upon the diaphragm with a P type diffusion layer having a pattern as shown in FIG. 7 by means of a well known mask diffusion method as well as with the strain sensitive elements, that is, the central strain sensitive elements 23 and 23' provided within the central portion of the strain sensitive region 21 and the outer strain sensitive elements 24 and 24' provided within the circumferential portion of the strain sensitive region 21, the crystallogralphic directions of the respective elements being the same as those given in the first embodiment.

The lead portions 48 have either a rectangular or polygonal configuration and the areas thereof are substantially greater than those of the strain sensitive elements 23 and 23' and 24 and 24'. The resistance of the lead portions 48 is therefore at most no more than one fifth the resistance of the respective strain sensitive elements 23 and 23' and 24 and 24', and consequently, the resistance variation of the lead portions 48 due to the piezoresistive effect thereof can be neglected even if a portion of the lead portions 48 which is located within the strain sensitive area is deflected as a result of any deformation of the strain sensitive area due to the application of an external force. Similarly, within the diaphragm 20 as fabricated in accordance with this second embodiment, the electrodes 47 are also disposed within the vicinity of the trailing linear edge of the rectangular portion 20b of the fixing region 22 of diaphragm 20 which is to be attached to the supporting member 3, by forming aluminum evaporated films of a rectangular configuration upon the surface of the end portions 46 which are disposed opposite the other ends of the lead portions 48 consisting of the P-type diffusion layer with which the elements 23 and 23' and 24 and 24' are associated.

According to such a predetermined pattern of diaphragm 20 characteristic of the second embodiment of the present invention, in order to form the lead portions 48 from the same P type diffusion layer as that utilized in the formation of the strain sensitive elements 23 and 23' and 24 and 24' and to collectively dispose the lead portions 48 within the vicinity of the trailing linear edge of diaphragm 20, the unified portion of the U-shaped outer strain sensitive elements 24 and 24' is directed radially inwardly towards the center of the circular strain sensitive region, unlike the case of the first embodiment, and the lead portions 48 are disposed close to one another thereby presenting six rectangular portions thereon.

It will be noted that two of the six rectangular lead portions, one of which is connected to one leg portion of the strain sensitive element 23' while the other of which is connected to one leg portion of the element 24, are connected to each other by means of an aluminum evaporation film having a U-shaped configuration so as to thereby form one electrode 47 thereon. Furthermore, upon the remaining four rectangular portions which are respectively connected to one leg portion of the elements 23, 24' and two polygonal lead portions 48, aluminum evaportation films are also respectively provided so as to form electrodes 47 thereon, and thus, five electrodes are provided upon the ends of the rectangular lead portions. It will also be noted that one of the polygonal lead portions 48 is respectively connected to the other leg portion of the elements 24' and 23', and the other thereof is similarly connected to the other leg portion of the elements 23 and 24. Thus, the lead portions 48 of the polygonal and rectangular forms are integrally formed and connected with the strain sensitive elements 23 and 23' and 24 and 24' upon the diaphragm base.

The diaphragm 20 is bonded to the upper flat surface of the supporting member 3, along the surface of diaphragm 20 which does not have the P type diffusion layer pattern, by means of an epoxy base adhesive, and the aluminum electrodes 47 upon diaphragm 20 are connected to the ends of gold wires 5 which are further connected to a processing circuit for use in the measurement process through means of the hookup terminals 40, lead wires 6 and cable 7, all in a manner similar to that of the first embodiment.

The description thus far given of the first and second embodiments of the present invention has included the disposition of diaphragms 2 and 20 as being supported upon supporting member 3 with the diaphragms 2 and 20 being exposed to atmospheric pressure.

Thus, when the circular strain sensitive region which is opposed to the pressure receiving chamber defined between the countersunk recess 31 of the supporting member 3 and the diaphragm is strained due to an applied external force, the central strain sensitive elements 23 and 23' and the outer strain sensitive elements 24 and 24', having their crystallographic directions so aligned as to afford maximum sensitivity and disposed within the strain sensitive region 21, serve to convert the tensile and compressive stresses developed within the strain sensitive region as a result of the applied external force to appropriate electrical signals. Such signals are of course transmitted through means of the lead portions 28, which comprise an aluminum evaporated film as formed within the first embodiment or lead portions 48 which comprise a P type diffusion layer as formed within the second embodiment, and through the lead wires 5 and 6 to an external processing circuit whereby changes in the pressure to be measured can be detected with a high degree of responsiblity and accuracy, the lead wires of course being led from the electrodes 27 or 47 through the leading part defined within supporting member 3 to the external processing circuit.

Thus it may be seen that the pressure transducer as comprised within the respective embodiments of the present invention has important advantages over the known prior art structures in that the transducer can afford the features which have heretofore been enumerated, particularly the features of size miniaturization and its concomitant extremely small thickness, as well as its high pressure sensitive characteristics. As a result, even a local pressure of a pressure fluid, which would otherwise not have been satisfactorily measured if conventional pressure transducers had been resorted to, may be accurately measured.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. A pressure transducer comprising:
   a semiconductor diaphragm having a predetermined conductivity and including a strain sensitive region adapted to be elastically deformed by means of pressure applied thereto and a fixing region;
   strain sensitive elements insulatingly disposed upon said diaphragm and relative to the crystallographic directions of said diaphragm so as to exhibit high sensitivity and within the vicinity of the central and peripheral portions of said strain sensitive region;
   lead portions, for transmitting electrical signals, insulatingly mounted upon said diaphrahm and extending from said strain sensitive region to one side of an end portion in said fixing region for electrically interconnecting said central and peripheral strain sensitive elements in order to form a bridge circuit which includes said central and outer strain sensitive elements and said lead portions;
   electrodes respectively provided upon said lead portions within said one side of the end portion in said fixing region;
   a supporting member including a supporting portion for supporting said semiconductor diaphragm by means of said fixing region of said diaphragm and a leading portion for conducting said electrical signals therethrough; and
   lead wires, connected to said electrodes and to external processing apparatus, disposed within and through said leading portion of said supporting member.
   whereby said electrical signals detected by means of said strain sensitive elements are conducted to said electrodes by said lead portions and further conducted outwardly of said transducer by said lead wires.

2. A pressure transducer as set forth in claim 1, wherein said strain sensitive elements comprise:
   strip type members of a semiconductor crystal of a conductivity type which is opposite to that of said semiconductor diaphragm.

3. A pressure transducer as set forth in claim 1, wherein said strain sensitive elements comprise:
   strip type members of a semiconductor crystal of a conductivity type which is the same as that of said semiconductor diaphragm yet having a resistivity of no more than one thousandth of that of said semiconductor diaphragm.

4. A pressure transducer as set forth in claim 1, wherein said lead portions comprise:
   aluminum evaporation films disposed upon said strain sensitive and fixing regions of said diaphragm.

5. A prsssure transducer as set forth in claim 1, wherein said lead portions comprise:
   semiconductor crystal layers of a conductivity type which is opposite to that of said diaphragm and which have areas which are substantially larger than the areas of said strain sensitive elements.

6. A pressure transducer as set forth in claim 1, wherein said supporting member comprises:
   a plate member having a countersunk recess provided within a portion thereof which corresponds to said strain sensitive region of said diaphragm and which has a configuration and area which is the same as that of said strain sensitive region of said diaphragm.

7. A pressure transducer as set forth in claim 1, wherein said leading portion of said supporting member comprises:
   an opening provided within said supporting portion which corresponds to the location of said electrodes of said diaphragm and a cut-away portion provided within an end face of said supporting member.
   whereby said lead wires may be connected to said electrodes within said opening of said leading part and may be led out of said supporting member through said cut-away portion of said leading portion.

8. A pressure transducer as set forth in claim 1, further comprising:
   a holding member secured to said supporting member of reinforcing said supporting member and for mounting hookup terminals thereto so as to fix said lead wires thereon.

9. A pressure transducer as set forth in claim 1, wherein said diaphragm further comprises:
   a light shield coating deposited upon the entire expanse of the exposed surface of said diaphragm for preventing the transmission of direct light beams to said diaphragm.

10. A pressure transducer as set forth in claim 1, wherein:
    said diaphragm is a thin plate which includes said strain sensitive region which is adapted to be elastically strained as a result of said external pressure being applied thereto and which converts said elastic strain thus produced into an electrical signal, and said fixing or attaching region surrounding said strain sensitive region, said thin plate being fabricated of a semiconductor signal crystal material of a predetermined conductivity type and said strain sensitive region of the diaphragm being circular in form and the thickness thereof being thinner than that of said fixing region of said diaphragm, a layer integrally formed upon one surface of said strain sensitive and fixing regions and having electrical insulating characteristics different from said semiconductor single crystal material of said diaphragm in that said layer is of a different conductivity type than that of said semiconductor single crystal material of said diaphragm and a resistivity of no more than one thousandth of the resistivity of said semiconductor single crystal material of said diaphragm, and further being of such a predetermined pattern which includes said semiconductor strain sensitive elements so as to convert a strain produced therewithin into an electrical signal according to a piezoresistive effect when an external pressure is exerted upon said strain sensitive region, at least one pair of said strain sensitive elements being disposed within a central portion of said strain sensitive region and of which the longitudinal directions are disposed relative to said crystallographic directions so as to present the maximum sensitivity therefor while at least one other pair of said strain sensitive elements, disposed in a circumferential portion of said strain sensitive region and of which the longitudinal directions also disposed relative to said crystallographic directions so as to present maximum sensitivity, are also disposed symmetrically with respect to the center line of said strain sensitive region which is parallel with said longitudinal directions of said central elements, and lead portions having a small resistance one end of which is respectively connected to one of said strain sensitive elements and the other end thereof is extended into said fixing region to said supporting member and which include electrodes which are positioned close to one another;

said supporting member being attached to said fixing region in such a manner that said strain sensitive region may be subjected to a pressure to be measured and being made of a material having substantially the same coefficient of thermal expansion as that of the material of said diaphragm, and which has a countersunk recess of a configuration and area which corresponds to those of said strain sensitive region of said diaphragm, a flat supporting part to be in contact with said fixing region of said diaphragm, and a leading part provided at the end portion of said supporting member which includes an opening provided within a portion thereof which corresponds to the portion of said electrodes disposed upon said lead portions of said diaphragm and through which said lead wires may be conducted outwardly of said transducer; and said lead wires for conducting outwardly said electrical signals being respectively connected at one end thereof to said electrodes of said lead portions on said diaphragm and disposed within said opening of said leading part of said supporting member and at the other end thereof to a signal processing circuit positioned externally of said transducer through hookup terminals positioned upon a holding member for reinforcing said supporting member.

11. A pressure transducer as set forth in claim 2, further comprising:
a holding member attached to said supporting member for reinforcing said supporting member and mounting hookup terminals thereon so as to fix said lead wires thereon.

12. A pressure transducer as set forth in claim 2, wherein said lead portions comprise:
aluminum evaporation films provided upon said strain sensitive and fixing regions of said diaphragm.

13. A pressure transducer as set forth in claim 2, wherein said lead portions comprise:
semiconductor crystal layers of a conductivity type which is opposite to that of said diaphragm and which include areas which are substantially larger than those of said strain sensitive elements.

14. A pressure transducer as set forth in claim 12, wherein:
said supporting member is a plate having a countersunk recess provided within a portion thereof which corresponds to said strain sensitive region of said diaphragm and which has the same configuration and area as that of said strain sensitive region;
said lead part of said supporting member includes an opening provided within a portion of said supporting part which corresponds to said electrodes of said diaphragm and a cut-away portion provided within one end face of said supporting member, said lead wires thereby being connected to said electrodes within said opening of said leading part and being led out therefrom through said cut-away portion thereof
a holding member is secured to said supporting member for reinforcing said supporting member and for mounting hookup terminals thereon so as to fix said lead wires thereon; and
said hookup terminals are mounted upon said holding member for connecting said lead wires connected to said electrodes to processing circuitry whereby said electrical signals are conducted externally from said transducer.

15. A pressure transducer as set forth in claim 14, wherein:
said semiconductor diaphragm has an arcuate portion and a rectangular portion and is of an N type silicon signal crystal of which the crystallographic plane is the (110) plane;
said strain sensitive region has a circular configuration and is formed so as to have a smaller thickness than said fixing region, by an etching method;
said strain sensitive elements are formed of a P type silicon layer by a mask diffusion method, said central strain sensitive elements including two elements disposed along the [1$\bar{1}$0] crystallographic direction and said outer strain sensitive elements includes two elements disposed along the [$\bar{1}$1$\bar{1}$] and [$\bar{1}$11] directions respectively;
said lead portions include P type silicon layers similar to that of said strain sensitive elements and have a predetermined pattern which is integrally formed upon said diaphragm, oxide films formed upon said P type silicon layers, and aluminum films which are formed upon said oxide films by a vacuum evaporation method, and are ohmically connected to said strain sensitive elements at one end thereof while the other end of said lead portions are collectively disposed at one end of said rectangaular portion of said diaphragm;
said electrodes being formed of aluminum films and provided upon said other ends of said lead portions by a bonding method;
said supporting member is a plate of crystallized glass having the same shape as that of said diaphragm and including said countersunk recess having a circular configuration similar to that of said strain sensitive region of said diaphragm and disposed within said arcuate portion of said diaphragm, said opening of said leading part being disposed at a position corresponding to said electrodes of said diaphragm disposed upon said rectangular portion, and said cut-away portion thereof being disposed within a side surface of said rectangular portion and which is connected to said opening, a beam portion being formed by said cut-away portion;

said holding member includes a plate having an arcuate portion having the same shape as that of said supporting member and a tail portion the width of which is gradually reduced;

said hookup terminals include five copper foils having a rectangular confugration and disposed upon said tail portion of said holding plate;

said lead wires include gold wires which are ohmically connected to said electrodes and said hookup terminals and are fixed to said beam portion of said supporting member at the intermediate portion thereof, and lead wires which are electrically connected to said hookup terminals and to a measurement circuit and which are covered by means fixed to said holding plate at the end portion of said tail portion thereof; and an insluating material of a silicon rubber is provided for imparting electrical insulation, which material covers the exposed portions of said gold and lead wires.

16. A pressure transducer as set forth in claim 14, wherein said diaphragm further comprises:

light shield means for coating the exposed surface of said diaphragm for preventing the transmission of direct light beams to said diaphragm.

17. A pressure transducer as set forth in claim 16, wherein:

said semiconductor diaphragm has an arcuate portion and a rectangular portion and is of an N type silicon crystal of which the crystallographic plane is the (110) plane;

said strain sensitive region has a circular configuration and is formed so as to have a smaller thickness than said fixing region, by an etching method;

said strain sensitive elements are formed of a P type silicon layer by a mask diffusion method, said central strain sensitive elements including two elements disposed along the [1$\bar{1}$0] crystallographic direction and said outer strain sensitive elements includes two elements disposed along the [$\bar{1}$1$\bar{1}$] and [$\bar{1}$11] directions, respectively;

said lead portions include P type silicon layers similar to that of said stain sensitive elements and have a predetermined pattern which is integrally formed upon said diaphragm, oxide films formed upon said P type silicon layers, and aluminum films which are formed upon said oxide films by a vacuum evaporation method, and are ohmically connected to said strain sensitive elements at one end thereof while the other end of said lead portions are collectively disposed at one end of said rectangular portion of said diaphragm;

said electrodes being formed of aluminum films and provided upon said other ends of said lead portions by a bonding material;

said supporting member is a plate of crystallized glass having the same shape as that of said diaphragm and including said countersunk recess having a circular configuration similar to that of said strain sensitive region of said diaphragm and disposed within said arcuate portion of said diaphragm, said opening of said leading part being disposed at a position corresponding to said electrodes of said diaphragm disposed upon said rectangular portion and said cut-away portion thereof being disposed within a side surface of said rectangular portion and which is connected to said opening, a beam portion being formed by said cut-away portion;

said holding member includes a plate having an arcuate portion having the same shape as that of said supporting member and a tail portion the width of which is gradually reduced;

said hookup terminals include five copper foils having a rectangular configuration and disposed upon said tail portion of said holding plate;

said lead wires include gold wires which are ohmically connected to said electrodes and said hookup terminals and are fixed to said beam portion of said supporting member at the intermediate portion thereof, and lead wires which are electrically connected to said hookup terminals and to a measurement circuit and which are covered by means fixed to said holding plate at the end portion of said tail portion thereof;

said diaphragm is coated with light shield means upon the entire exposed surface thereof; and said exposed portions of said gold and lead wires are covered with an insulating material of a silicon rubber for providing electrical insulation therefor.

18. A pressure transducer as set forth in claim 13, wherein:

said supporting member is a plate having a countersunk recess provided within a portion thereof which corresponds to said strain sensitive region of said diaphragm and which has the same configuration and area as that of said strain sensitive region;

said leading part of said supporting member includes an opening provided within a portion of said supporting part which corresponds to said electrodes of said diaphragm and a cut-away portion provided within one end face of said supporting member, said lead wires thereby being connected to said electrodes within said opening of said leading part and being led out therefrom through said cut-away portion thereof;

a holding member is secured to said supporting member for reinforcing said supporting member and for mounting hookup terminals thereon so as to fix said lead wires thereon; and said hookup terminals are mounted upon said holding member for connecting said lead wires connected to said electrodes to processing circuitry whereby said electrical signals are conducted externally from said transducer.

19. A pressure transducer according to claim 18, wherein:

said semiconductor diaphragm has an arcuate portion and a rectangular portion and is composed of an N type silicon single crystal of which the crystallographic plane is the (110) plane;

said strain sensitive region has a circular configuration and is formed so as to have a smaller thickness than said fixing region, by an etching method;

said strain sensitive elements are formed of a P type silicon layer by a mask diffusion method, said central stain sensitive elements including two elements disposed along the [1̄10] crystallographic direction and said outer strain sensitive elements include two elements disposed along the [1̄11̄] and [1̄11] directions respectively;

said lead portions include P type silicon layers having an area which is substantially greater than that of said strain sensitive elements and which include rectangular and polygonal connecting parts having a substantially large width, four of said rectangular portions being separately defined while two other portions are connected so as to form a U-shaped integrally formed portion, all of said portions being collectively and integrally formed with said connecting parts upon said diaphragm;

said diaphragm is covered with an oxide film;

said electrodes include four rectangular and one U-shaped portions formed of aluminum films deposited by means of an evaporation method provided upon said four rectangular and one U-shaped portion collectively disposed upon said diaphragm;

said supporting member is a plate of crysatllized glass having the same shape as that of said diaphragm and including said countersunk recess having a circular configuration similar to that of said strain sensitive region of said diaphragm and disposed within said arcuate portion of said diaphragm, said opening of said leading part being disposed at a position corresponding to said electrodes of said diaphragm disposed upon said rectangular portion and said cut-away portion thereof being disposed within a side surface of said retangular portion and which is connected to said opening, a beam portion being formed by said cut-away portion;

said holding member includes a plate having a arcuate portion having the same shape as that of said supporting member and a tail portion the width of which is gradually reduced;

said hookup terminals include five copper foils having a rectangular configuration and disposed upon said tail portion of said holding plate;

said lead wires include gold wires which are ohmically connected to said electrodes and said hookup terminals and are fixed to said beam portion of said supporting member at the intermediate portion thereof, and lead wires which are electrically connected to said hookup terminals and to a measurement circuit and which are covered by means fixed to said holding plate at the end portion of said tail portion thereof; and an insulating material, of a silicon rubber for providing electrical insulation, which covers the exposed portions of said gold and lead wires.

20. A pressure transducer as set forth in claim 1, wherein:

said diaphragm is a thin plate which includes said strain sensitive region which is adapted to be elastically strained as a result of said external pressure being applied thereto and which converts said elastic strain thus produced into an electrical signal, and said fixing or attaching region surrounds said strain sensitive region, said thin plate being fabricated of a semiconductor signal crystal material of a predetermined conductivity type and said strain sensitive region of the diaphragm being circular in form and the thickness thereof being thinner than that of said fixing region of said diaphragm, a layer integrally formed upon one surface of said strain sensitive and fixing regions and having electrical insulating characteristics different from said semiconductor single crystal material of said diaphragm in that said layer is of a type having the same conductivity as that of said semiconductor single crystal material of said diaphragm and a resistivity of no more than one thousandth of the resistivity of said semiconductor single crystal material of said diaphragm, and further being of such a predetermined pattern which includes said semiconductor strain sensitive elements so as to convert a strain produced therewithin into an electrical signal according to a piezoresistive effect when an external pressure is exerted upon said strain sensitive region, at least one pair of said strain sensitive elements being disposed within a central portion of said strain sensitive region and of which the longitudinal directions are disposed relative to said crystallographic directions so as to present the maximum sensitivity therefor while at least one other pair of said strain sensitive elements, disposed in a circumferential portion of said strain sensitive region and of which the longitudinal directions also disposed relative to said crystallographic directions so as to present maximum sensitivity, are also disposed symmetrically with respect to the center line of said strain sensitive region which is parallel with said longitudinal directions of said central elements, and lead portions having a small resistance, one end of which is respectively connected to one of said strain sensitive elements and the other end thereof is extended into said fixing region to said supporting member and which include electrodes which are positioned close to one another;

said supporting member being attached to said fixing region in such a manner that said strain sensitive region may be subjected to a pressure to be measured and being made of a material having substantially the same coefficient of thermal expansion as that of the material of said diaphragm, and which has a contersunk recess of a configuration and area which corresponds to those of said strain sensitive region of said diaphragm, a flat supporting part in contact with said fixing region of said diaphragm, and a leading part provided at the end portion of said supporting member which includes an opening provided within a portion thereof which corresponds to the portion of said electrodes disposed upon said lead portions of said diaphragm and through which said lead wires may be conducted outwardly of said transducer; and said lead wires for conducting outwardly said electrical signals being respectively connected at one end thereof to said electrodes of said lead portions on said diaphragm and disposed within said opening of said leading part of said supporting member and at the other end thereof to a signal processing circuit positioned externally of said transducer through hookup terminals positioned upon a holding member for reinforcing said supporting member.

* * * * *